Patented July 18, 1939

2,166,503

UNITED STATES PATENT OFFICE 2,166,503

METHOD OF REFINING OILS

Oswald H. Milmore, Berkeley, Calif., assignor to Shell Development Company, San Francisco, Calif., a corporation of Delaware No Drawing. Application November 6, 1937, Serial No. 173,198

10 Claims. (Cl. 196—34)

This invention relates to improvements in the refining of hydrocarbon mixtures such as oils, waxes, and oils rich in hydrocarbons, and is particularly concerned with the acid treatment of the more viscous fractions derived from petroleum crude oils, shale oils, coal tar oils, and the like, by distillation or treatment with solvents, such as lubricating and transformer oils, as well as with the acid treatment of long mineral oil fractions containing such viscous fractions. The initial mixture may be residual or distillate fractions, but is of particular advantage with the former. The initial material may be normally liquid or solid and the term "hydrocarbon mixture" is, in the present specification and claims, intended to include waxes as well as normally liquid oils containing wax. For convenience, the invention will, in this specification, be described as applied to the treatment of oils. This application is a continuation-in-part of my application Serial No. 53,585, filed December 9, 1935.

It is known to dilute lubricating and similar mineral oil fractions with low boiling normally liquid or with liquefied normally gaseous hydrocarbons during or prior to acid treatment. Difficulty is, however, often experienced in separating the acid sludge from the oil because the sludge particles are often very fluid or are too finely dispersed in the oil to be removed by ordinary settling or centrifuging. Also, the quantity of oil separated from the main body of the treated oil with the acid sludge is frequently such as to reduce the yield of treated oil substantially below that which is theoretically possible when the quantities of actual impurities in the oil are considered. Such treatments, moreover, do not greatly improve the viscosity-temperature characteristics, as expressed, for example, by the viscosity index.

In accordance with the present invention I have found that the separation of the acid sludge from oil can be enhanced whereby the properties and/or the yield of the oil is greatly improved by adding to the oil, either before or during or after contacting with the acid, a quantity of a low-molecular weight non-hydrocarbon treating agent at a para-critical temperature, as defined below. While the treating agent may be employed alone, it is greatly preferred to employ it in solution with a normal liquid diluent or solvent which is a mutual solvent for the treating agent and the oil being treated, because without such diluent it becomes necessary to employ inconveniently high pressures to dissolve in the oil a quantity of the treating agent therefor which is sufficient to produce the desired improvement in the separation of the sludge, particularly when the treating agent is above its critical temperature.

The temperature of the sludge separation step is selected sufficiently high to cause the low-molecular weight treating agent to have a low internal pressure, i. e., an internal pressure of the order of that of gases. This occurs at temperatures higher than a temperature about 20 to 40° C. below the critical temperature of the treating agent. Such temperatures are in the present specification and claims designated as "para-critical"; it includes temperatures slightly below the critical, the critical temperature, and temperatures above the critical temperature of the treating agent. Liquids having temperatures lower than para-critical are referred to as "normal liquids".

The temperature of the process is preferably carried out at relatively low temperatures, such as from about 0 to 50° C., and lower, to avoid oxidation of the oil. Higher temperatures, such as 100° C. may, however, also be employed, but it may then be desirable to use acid of lower concentrations to avoid or regulate oxidation of the oil and corrosion of the apparatus. Since, however, the removal of acid sludge can be readily achieved by my process at such elevated temperatures, and since oxidation of the oil is not always undesirable, my process is not limited to the use of low temperatures.

While the acid may be commingled with the oil either before or after the addition of the treating agent and/or the normal liquid diluent, I have found it to be more desirable to add at least the normal liquid diluent to the oil prior to the addition of the acid. This has the advantage of preventing local overheating and oxidation, and of insuring better contact between the acid and oil.

Any low molecular weight non-hydrocarbon substance which is capable of being dissolved in the oil, or in its solution in a liquid diluent, in an effective quantity at its para-critical temperature to cause a lowering of the density and internal pressure of the oil may be employed as the treating agent. Since the present process is carried out at temperatures in the proximity of or above the critical temperature of the treating agent, it is necessary to select a substance having a low enough critical temperature to avoid the necessity of operating at inconveniently or undesirably elevated temperatures. The preferred group of low molecular weight treating agents, suitable for treatments up to 50° C. consists of carbon dioxide, hydrogen chloride, and methyl fluoride. Examples of other substances which may be employed are: hydrogen, water gas, silicon tetrafluoride, sulfur hexafluoride, sulfur dioxide, sulfur trioxide, ethyl chloride, dichlor-difluor methane, methylene fluoride, dimethyl ether, methyl ethyl ether, and rare gases, such as helium. The treating agent may comprise a mixture of several low-molecular weight non-hydrocarbons, or a low-molecular weight hydrocarbon with a low molecular weight hydrocarbon, like methane, ethane, natural gas, etc. The treating agent should, preferably, be incapable of reacting chemically with the oil or with the acid employed. For this reason basic substances like ammonia are usually undesirable because of reaction with the acid.

The pressure must be sufficient to dissolve an effective quantity of the treating agent in the oil. The exact quantity depends upon the viscosity and composition of the oil, and upon the nature, concentration and temperature of the acid employed. In most cases, it is desirable to dissolve at least 0.20 gram moles of the treating agent for 100 grams of oil, and I prefer to employ at least 0.50 gram moles of the treating agent, and as much as 5.0 or more molecular weights of the treating agent are suitable, although my invention is not restricted to operations between these limits. The best results are obtained when the concentration of the treating agent is within about 25% of the concentration necessary for incipient phase separation in the absence of the acid, incipient phase separation occurring when the oil is saturated with the treating agent and in a single liquid phase, but the addition of a small quantity of the treating agent will cause its separation into two phases. Concentrations above that necessary for incipient phase separation, at which the oil exists in two liquid phases, may be employed, but I prefer to operate below such concentrations. The pressures will in most cases be between 100 and 1500 lbs./sq. in. gauge. At such pressures a gas phase may be present above the solution of oil and treating agent, but the process may also be operated in the absence of a gas phase.

As pointed out heretofore, the solubility of the treating agent at a para-critical temperature is low and it is very desirable to enhance the solubility by employing it together with a diluent which is a normal liquid at the temperature of the treatment. The diluent will, therefore, have a higher critical temperature than the treating agent. The diluent should preferably have a relatively low internal pressure, thereby aiding the action of the treating agent, which has an internal pressure of the order of that of a gas. This diluent or mutual solvent may, for example, be a low boiling normally liquid or a liquefied normally gaseous aliphatic hydrocarbon of the type commonly known as deasphalting agents, consisting predominantly of hydrocarbons containing from two to sixteen carbon atoms, such as ethane, propane, butane, normal- and iso-butane, pentanes, heptanes, their higher homologues, gasoline, and naphtha. The corresponding olefines, may also be employed, but are not preferred because of possible polymerization in the presence of acid, but can be used in certain situations. Non-hydrocarbons such as alkyl halides like propyl chloride may also be employed as diluents, either alone, or in admixture with hydrocarbons.

Good results are obtained by using a normally liquid diluent, such as isopentane. The branched chain saturated paraffinic hydrocarbons containing between four and sixteen carbon atoms, and particularly those between five and ten carbon atoms, their mixtures and fractions consisting predominantly thereof are preferred. These hydrocarbons may contain one or more tertiary or quarternary carbon atoms, or both quarternary and tertiary carbons. Specific examples are: isopentane, 3-methyl pentane, 2,2-dimethyl-butane, 2,2,3-trimethyl butane, and 2,2,4-trimethyl pentane (iso-octane).

Whether a compound is to be employed as a treating agent or as a normal liquid diluent is determined by the temperature of operation, the treating agent being above its critical temperature, and the diluent in the normal liquid state. For example, when operating at 40° C., carbon dioxide or hydrogen chloride may be employed as the treating agent and liquid propane or isopentane may be employed as the diluent.

I prefer to employ between one and six volumes of the diluent for each volume of the oil treated, although lower and higher amounts may be used. The more viscous oils generally require more diluent than the less viscous oils. All or part is preferably added to the oil prior to the addition of the acid, this amount being preferably sufficient to bring the viscosity of the resulting oil solution to below 200 seconds Saybolt Universal at 100° F.

The process may be applied to treatments with any sludge forming acid, particularly to the strong oxy-mineral acids, like sulfuric acid, phosphoric acid, and mixtures of acids, such as a mixture of sulfuric and acetic acids. As is understood in the art, the acid requirements vary with the viscosity and composition of the oil being treated. By way of example, it may be stated that sulfuric acid of between 85 and 100% concentration, and generally above 90% is suitable for the more viscous oils; it may be desirable to employ fuming sulfuric acid, such as 20% oleum, particularly in the refining of viscous white oils. The quantity of acid may, for example, be between five and fifty pounds of 66° Bé. acid per barrel (42 U. S. gallons) of oil. After the separation of the acid sludge the treating agent and diluent may be separated from the oil, either before or after neutralization in the usual way, e. g., with caustic or clay.

The oil to be acid treated may, if desired, be given a preliminary refining treatment, such as an extraction with selective solvents, a dewaxing treatment, and/or asphaltic bodies may be preliminarily precipitated by mixing the initial oil with normally gaseous hydrocarbons, or by treating the inital oil with a low-molecular weight hydrocarbon or non-hydrocarbon treating agent of the type described above under para-critical temperature conditions (i. e., at a temperature above, at, or down to about 20 to 40° C. below its critical temperature), and sufficient pressures to cause the formation of two or more liquid phases, as described in Example II. In the last named alternative, the normal liquid diluent may be present in the preliminary treatment, and one of the resulting oil fractions, as for example, the lighter liquid phase produced in the treatment may, after its separation from the other phase, be contacted with the acid.

While my process may be applied to the acid treatment of any hydrocarbon mixtures, it is particularly useful in the treatment of the more viscous residual normally liquid oils, such as those having viscosities above 60 seconds Saybolt Universal at 210° F. It may, however, also be applied advantageously to distillate oils, and to oils having lower viscosities such as 125 seconds Saybolt Universal at 130° F., and to the treatment of waxes. In the case of waxes, it is desirable to heat the wax sufficiently to melt it and/or dissolve it in the normal liquid diluent; a normally liquid diluent is preferred in this case to a normally gaseous liquefied diluent. The process of the present invention may be applied advantageously to a wax-bearing oil, the acid treated oil, either prior to or after neutralization, being dewaxed to produce a wax having improved properties, such as color. The dewaxing may also be carried out simultaneously with the step of removing the sludge by the application of a low temperature, either before or after mixing with the acid, but preferably after. The present process is particularly useful in the treatment of hydrocarbon oils having a viscosity greater than about 125 seconds Saybolt Universal at 130° F.

The invention may be further understood from the following example which is, however, only for the purpose of illustrating the invention, and not for the purpose of limiting the scope of the appended claims.

EXAMPLE I

A Coalinga residual oil was deasphalted with 2.05 parts by weight of liquid propane for each part of oil at 56° C. The deasphalted oil had a color on the A. S. T. M. scale of 8 diluted.

One portion of the deasphalted oil and propane was saturated with carbon dioxide at 623 lbs. per sq. in. and 10.7 grams of 96% sulfuric acid for each 100 grams of oil were added, the mixture was agitated for one hour, after which the sludge formed was allowed to settle for one hour and drawn off. The solution of treated oil was drawn off through an evaporator and the propane and carbon dioxide removed. The oil was diluted with isopentane to prevent emulsification and neutralized with 20° Bé. sodium hydroxide solution.

A second portion of the oil was similarly treated with acid, but in the absence of carbon dioxide; a third portion was similarly treated, but in the absence of carbon dioxide or propane. All treatments save the deasphalting step were carried out at 20° C. The results are shown in Table I, yields being based on the deasphalted oil. The color was determined by the method D 155–34T of the American Society for Testing Materials. Diluted colors were determined by employing a solution of 85% kerosene and 15% oil.

Table I

| Amount by weight of propane per 100 parts of oil | 289 | 289 | 0 |
|---|---|---|---|
| Gas used | CO₂ | None | None |
| Pressure, lbs. per sq. in | 400 | 120 | -------- |
| Yield of treated oil, percent by weight | 80.9 | 83.4 | 74.6 |
| A. S. T. M. color of treated oil | 7– | 4–½ dil. | 4–½ dil. |

It will be noted that the color of the oil which was treated in accordance with the present invention, employing carbon dioxide, was much lighter than the oil treated by the use of propane alone, indicating a far more complete and rapid separation of sludge.

EXAMPLE II

One part by weight of a wax-bearing Mid-Continent residual oil was dissolved in 2.9 parts of propane, and carbon dioxide was pumped into the resulting solution at 20° C. to cause the formation of two liquid phases, the pressure being increased progressively to dissolve more carbon dioxide, thereby decreasing the oil in the lighter phase until at a pressure of 450 lbs./sq. in. gauge 26.5% of the oil was precipitated and 73.5% remained in the lighter liquid phase, which was separated from the precipitated oil. The oil in the lighter phase, herein designated as the "raffinate" was used as the starting material for the acid treatment, and its properties are given in the second column of Table II.

One portion of the raffinate oil, containing propane and carbon dioxide in the concentrations in which they occurred in the lighter phase was mixed with 11% (computed on the raffinate oil) of 96% sulfuric acid at 20° C., and 450 lbs./sq. in. pressure, agitated, and allowed settle. The raffinate oil contained approximately 3.8 gram moles of carbon dioxide to 100 grams of raffinate oil, the concentration which corresponds to incipient separation into phases. The solution of oil in propane and carbon dioxide was separated from the settled sludge by decantation, and the propane and carbon dioxide were separated from the oil. The oil was then dewaxed at −22° C. in the presence of a dewaxing solvent consisting of 40% methyl ethyl ketone and 60% benzol. The properties of the acid treated, dewaxed oil are given in the third column of the table.

Another portion of the raffinate oil was freed from the propane and carbon dioxide, similarly treated with 11% of 90% sulfuric acid and the desludged oil similarly dewaxed. The properties of the resulting oil are shown in the fourth column of the table.

Table II

| | Raffinate oil | Acid treated dewaxed oils | |
|---|---|---|---|
| | | With propane and CO₂ | Without diluent |
| Specific gravity $d_{20}^{20}$ | 0.9022 | 0.8956 | 0.9003 |
| Saybolt Universal viscosity: | | | |
| At 100° F | 649 | 678 | 681 |
| At 210° F | 69.6 | 69.6 | 69.4 |
| Viscosity index | 91 | 85 | 84 |
| Color | 5–D | 3+D | 4–D |
| Yield | 100% | 65% | 58.5% |

It will be noted that the yield, color, and viscosity index were each more favorable in the oil treated in accordance with the present invention than in the other treatment.

I claim as my invention:

1. The process for refining a viscous hydrocarbon mixture comprising the steps of contacting said mixture with a strong sludge-forming acid and separating the resulting sludge from the acid mixture in the presence of at least 0.20 gram moles per 100 grams of the mixture of a low molecular weight non-hydrocarbon treating agent which is not chemically reactive with the acid and which is in its para-critical state at 100° C. dissolved in the mixture under superatmospheric pressure at a para-critical temperature for the treating agent.

2. The process according to claim 1 in which the treating agent is carbon dioxide.

3. The process according to claim 1 in which the treating agent is methyl fluoride.

4. The process for refining a viscous hydrocarbon mixture comprising the steps of diluting said mixture with a low boiling liquid hydrocarbon solvent for the mixture and for a low molecular weight non-hydrocarbon treating agent which is not chemically reactive with the acid employed and which is in its para-critical state at 100° C., contacting the mixture with a strong sludge-forming acid and separating the resulting sludge from the acid diluted mixture in the presence of at least 0.20 gram moles for each 100 grams of the mixture of said treating agent dissolved in the mixture under superatmospheric pressure at a para-critical temperature for the treating agent and substantially below the critical temperature of the liquid solvent.

5. The process according to claim 4 in which the low boiling solvent consists predominantly of liquefied, normally gaseous aliphatic hydrocarbons.

6. The process according to claim 4 in which the quantity of the treating agent is below, and within about 25% of, the concentration corresponding to incipient separation of the mixture into liquid phases in the absence of the acid.

7. The process for refining a viscous hydrocarbon mixture comprising the steps of diluting said mixture with a low boiling liquid hydrocarbon solvent consisting predominantly of saturated aliphatic hydrocarbons having not over sixteen carbon atoms in the molecule, contacting the diluted mixture with a strong sludge-forming acid, and separating the resulting sludge from the acid diluted mixture in the presence of at least 0.20 gram moles for each 100 grams of the mixture of a low molecular weight non-hydrocarbon treating agent which is not chemically reactive with the acid and which is in its para-critical state at 100° C. dissolved in said oil under superatmospheric pressure at a para-critical temperature for the treating agent and substantially below the critical temperature of the liquid hydrocarbon solvent.

8. The process for refining a viscous hydrocarbon oil comprising the steps of subjecting said oil in the liquid state to the precipitating action of a quantity of low molecular weight substance at a para-critical temperature, said quantity being sufficient to cause the formation of two liquid phases of different densities, separating said phases, commingling one of said phases with a strong sludge-forming acid, and separating the resulting sludge from the acid oil in the presence of at least 0.20 gram moles for each 100 grams of the oil of a low molecular weight non-hydrocarbon treating agent which is not chemically reactive with the acid and which is in its para-critical state at 100° C. dissolved in said oil under superatmospheric pressure at a para-critical temperature for said treating agent.

9. The process for refining a viscous wax-bearing hydrocarbon oil comprising the steps of diluting said oil with a low boiling liquid hydrocarbon solvent for the oil and for a low molecular weight non-hydrocarbon treating agent which is not chemically reactive with the acid employed and which is in its para-critical state at 100° C., contacting the oil with a strong sludge-forming acid, separating the resulting sludge from the acid diluted oil in the presence of at least 0.20 gram moles for each 100 grams of the oil of said treating agent dissolved in the oil under superatmospheric pressure at a para-critical temperature for the treating agent and substantially below the critical temperature of the liquid solvent, and dewaxing the oil after the acid contacting.

10. The process according to claim 9 in which the dewaxing is effected simultaneously with the step of separating the sludge from the acid oil.

OSWALD H. MILMORE.